United States Patent
Nepela et al.

[11] Patent Number: 6,163,426
[45] Date of Patent: Dec. 19, 2000

[54] MAGNETORESISTIVE HEAD WITH MINIMAL ELECTROMIGRATION

[75] Inventors: Daniel Nepela; Chung F Lam, both of San Jose, Calif.

[73] Assignee: Read Rite Corporation, Fremont, Calif.

[21] Appl. No.: 09/112,173

[22] Filed: Jul. 8, 1998

Related U.S. Application Data

[63] Continuation-in-part of application No. 08/636,059, Apr. 23, 1996, Pat. No. 5,793,550.

[51] Int. Cl.[7] ............................................. G11B 5/03
[52] U.S. Cl. .............................................. 360/66; 360/313
[58] Field of Search ............................... 360/66, 113, 67, 360/46, 313

[56] References Cited

U.S. PATENT DOCUMENTS

| | | | |
|---|---|---|---|
| 5,367,411 | 11/1994 | Nishiyama et al. | 360/66 |
| 5,432,734 | 7/1995 | Kawano et al. | 360/113 |
| 5,444,589 | 8/1995 | Hu et al. | 360/113 |
| 5,572,379 | 11/1996 | Aoi et al. | 360/113 |
| 5,606,470 | 2/1997 | Shioya et al. | 360/66 |
| 5,615,063 | 3/1997 | Kuroki et al. | 360/78.04 |
| 5,719,729 | 2/1998 | Koyama et al. | 360/113 |

*Primary Examiner*—W. Chris Kim
*Assistant Examiner*—Regina Y. Neal
*Attorney, Agent, or Firm*—Samuel A. Kassatly

[57] ABSTRACT

A magnetoresistive head achieves maximum signal output with minimal electromigration by using a magnetoresistive element through which a unidirectional sense current is flown. Periodically, a control circuit determines whether one or more switching criteria have been met, and applies a counter-directional compensation current in the magnetoresistive element when the switching criteria are met, thus suppressing electromigration in the magnetoresistive element in the direction of said sense current. In a preferred embodiment, the compensation current is applied during a quiescence period. In another embodiment a continuous unidirectional sense current is flown through the magnetoresistive element, and the control circuit suspends the sense current in the magnetoresistive element for a period of time when one or more switching criteria have been met, so as to prevent atomic excursion beyond one atomic diameter, such that electromigration in the magnetoresistive element is substantially reduced in the direction of the sense current.

21 Claims, 11 Drawing Sheets

MAGNETORESISTIVE HEAD WITH MINIMAL ELECTROMIGRATION

CROSS-REFERENCE TO RELATED APPLICATIONS

The present patent application is a continuation-in-part application of co-ending patent application titled "Magnetoresistive Head Using Sense Currents of Opposite Polarities", Ser. No. 08/636,059, filed on Apr. 23, 1996, now U.S. Pat. No. 5,793,550, which is incorporated herein by reference.

FIELD OF THE INVENTION

This invention relates to magnetoresistive heads and in particular to a magnetoresistive element for reading data recorded on a magnetic medium which realizes optimal signal output with minimal risk of electromigration.

DESCRIPTION OF THE PRIOR ART

Disk drives typically include a stack of spaced apart magnetic disks that are mounted on a common shaft, and an actuator arm assembly comprising a plurality of arms extending into the spaces between the disks. Mounted on the distal end of each arm is a resilient load beam which supports a miniaturized gimbal assembly. The gimbal assembly includes an air bearing slider pivotally attached to a flexure. Magnetic transducers, employed to interact with the disks, are affixed to the slider.

In presently known disk drives, the magnetic transducers include inductive elements for recording data onto a disk, and magnetoresistive (MR) elements for reading the recorded data from the disk. The operation of the MR element is based on the principle that the resistance of certain materials changes when subjected to a magnetic field. Output signals from the MR element are generated by supplying it with a constant direct electrical current. The flux from the magnetic disk seen by the sensing MR element is reflected by a change in voltage that is proportional to the change in resistance of the material caused by the flux.

One objective when using a flying head or air bearing slider on which the MR element is deposited to operate in a transducing relationship with the disk is to increase the current density through the MR element in order to maximize the output signal. However, a problem with increasing the current density is the failure caused by electromigration. The electromigration phenomenon occurs when a unidirectional current flows through the MR element and directionally biases the atom motion and/or diffusion within the MR element, resulting in an ultimate electrical open in the MR element that is preceded by increasing MR element resistance, increased operating temperature, and eventual catastrophic damage to the MR element.

SUMMARY OF THE INVENTION

An object of this invention is to provide an MR head that realizes maximum signal output by providing a compensation mechanism and operating method for substantially minimizing electromigration.

Another object of this invention is to flow an increased direct current with a single polarity through the MR element, with minimal long term directional diffusion, for the purpose of increasing the signal output.

An object of this invention is to provide an MR head that realizes maximum signal output by providing a compensation mechanism and operating method for substantially minimizing electromigration.

According to this invention, a magnetoresistive head achieves maximum signal output with minimal electromigration by using a magnetoresistive element through which a unidirectional sense current is flown during the reading operation. Periodically, a control circuit determines whether one or more switching criteria have been met, and applies a counter-directional compensation current in the magnetoresistive element when the switching criteria are met, thus suppressing electromigration in the magnetoresistive element in the direction of said sense current. In a preferred embodiment, the compensation current is applied during a quiescence period.

BRIEF DESCRIPTION OF THE DRAWING

The invention will be described in greater detail with reference to the drawing in which.

Similar numerals refer to similar elements in the drawing. It should be understood that the sizes of the different components in the figures are not necessarily in exact proportion, and are shown for visual clarity and for the purpose of explanation.

DETAILED DESCRIPTION OF THE INVENTION

Figure 1:
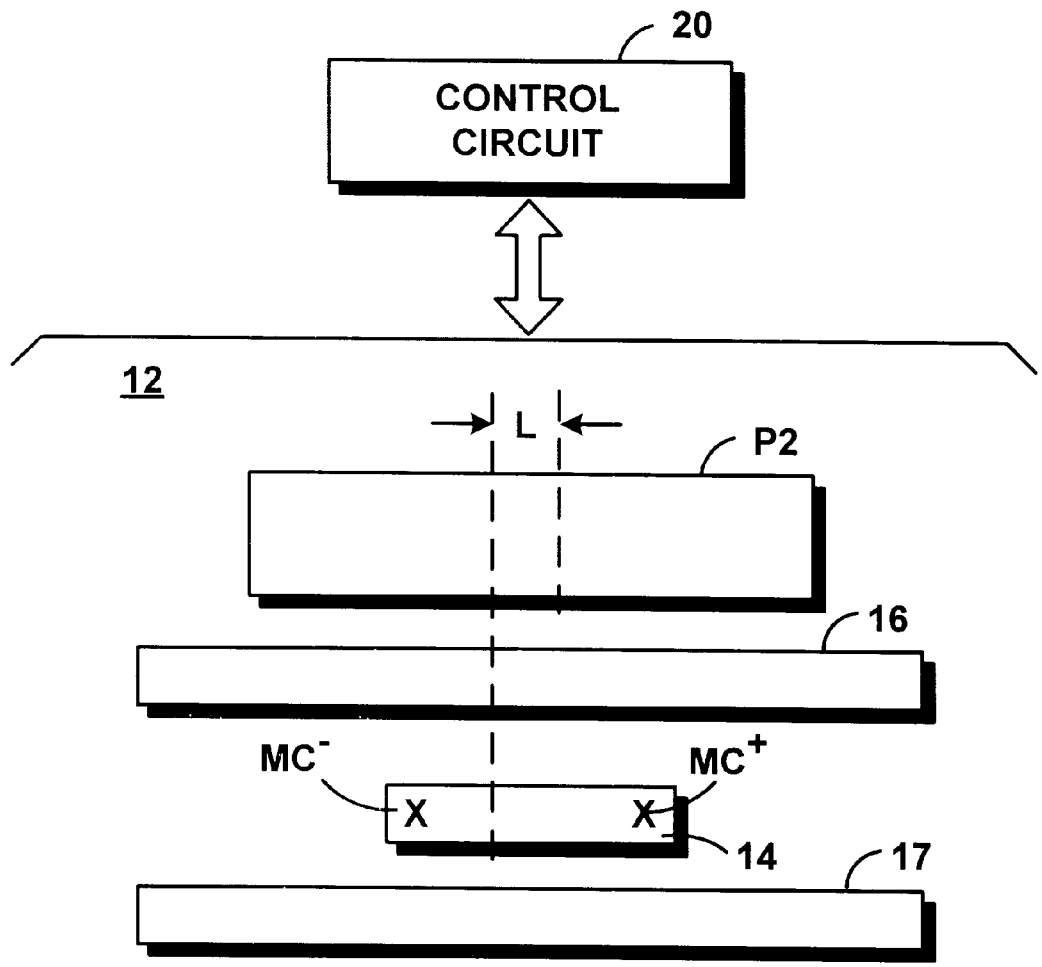
FIG. 1 is a representational view depicting the position of a MR head relative to an inductive pole in a slider made according to the present invention.

FIG. 1 shows part of a slider 12 used in a MR head in accordance with the present invention. The slider 12 includes an inductive element 14 that has a shield-type construction, wherein the MR element 14 is disposed between two thin film magnetic shields 16, 17. The first magnetic shield 16 also forms part of the magnetic circuit of an inductive write transducer having a pole P2.

The geometric centers of the pole P2 and the MR element 14 are offset by a predetermined distance L. The offset distance L is a function of the skew angle range of the magnetic disk/transducer combination. The skew angle range is typically between −5° for the inner diameter track and +15° for the outer diameter track of the magnetic disk (not shown). For any fixed skew angle range, the offset distance L is a constant, and is defined by the following equation (1):

$$L = S \cdot \tan \Theta_{MD}, \qquad (1)$$

where S is the spacing between the MR element 14 and the pole P2, and $\Theta_{MD}$ is the middle track skew angle and is defined by the following equation (2):

$$\Theta_{MD} = (\Theta_{ID} + \Theta_{OD})/2. \qquad (2)$$

In the above equation $\Theta_{ID}$ and $\Theta_{OD}$ are respectively defined as the skew angles of the inner and outer tracks of the magnetic disk.

In addition to the physical positioning of the MR head relative to the magnetic disk, the control system 20 positions the MR element 14 relative to the track from which data is read, in order to maintain the optimal magnetic position of the MR element 14 relative to the magnetic disk. To this end, two magnetic centers MC⁻ and MC⁺ are symmetrically defined, one on each side of the geometric center of the MR element 14, such that MC⁻ coincides with the peak P⁻ of the negative micro-track voltage output profile (NMT) shown in FIG. 3, and MC⁺ coincides with the peak P⁺ of the positive micro-track voltage output profile (PMT). It should be understood that while conventional MR heads have a single micro-track voltage output profile, this invention makes use of two sequentially occurring positive and negative micro-track voltage output profiles PMT and NMT.

Figure 3:
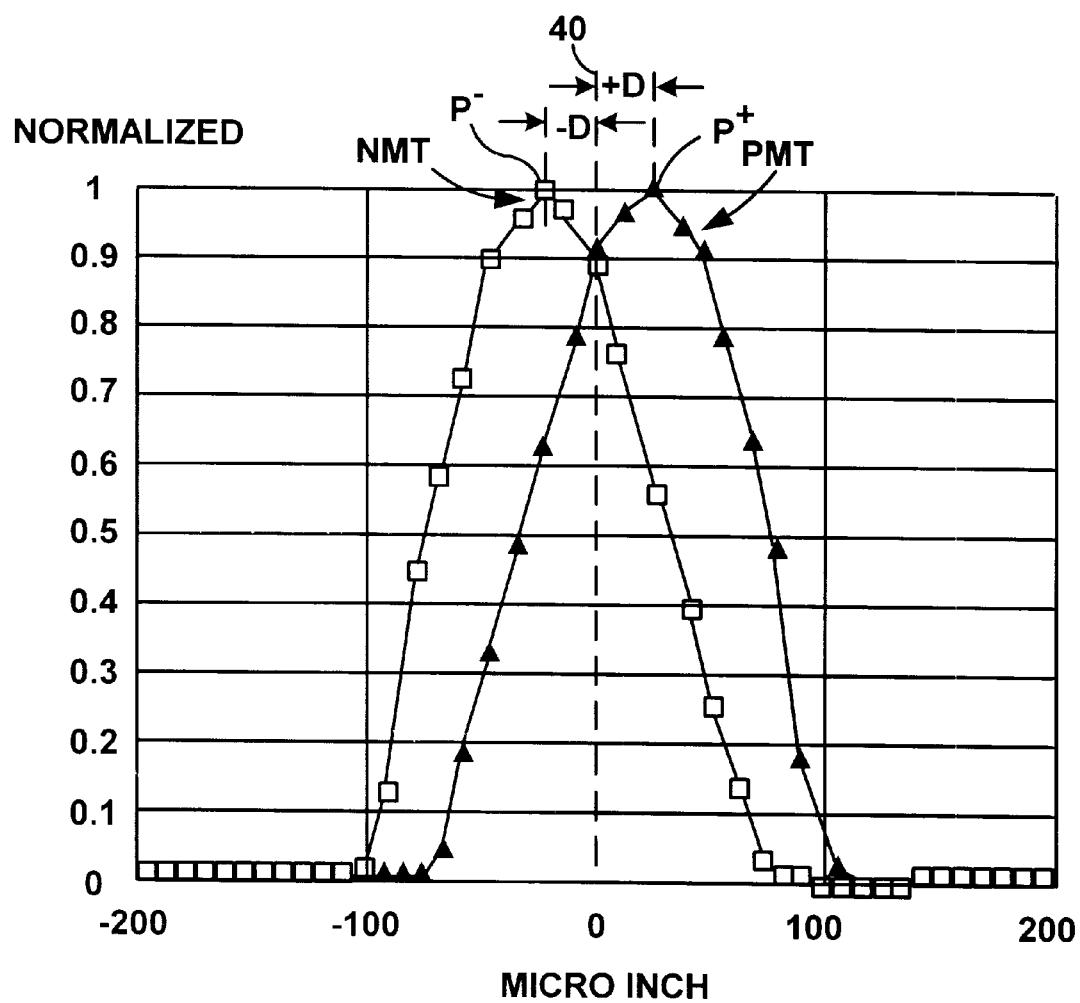
FIG. 3 is a plot of two normalized micro-track voltage output profiles relative to the current direction in the MR head of FIG. 1.

With reference to FIG. 3, the positive micro-track voltage output profile PMT corresponds to a direct current passing through the MR element 14 in one direction, while the negative micro-track voltage output profile NMT corresponds to a direct current passing through the MR element 14 in the opposite direction. The peak P⁺ is located at a distance or displacement +D from the center line 40 and the peak P⁻ is located at a distance or displacement −D from the center line 40, as shown in FIG. 3. The center line 40 corresponds to the middle track of the magnetic disk. The displacements +D and −D are referred to as micro-jogs and are determined by the geometry of the MR head.

Figure 2:
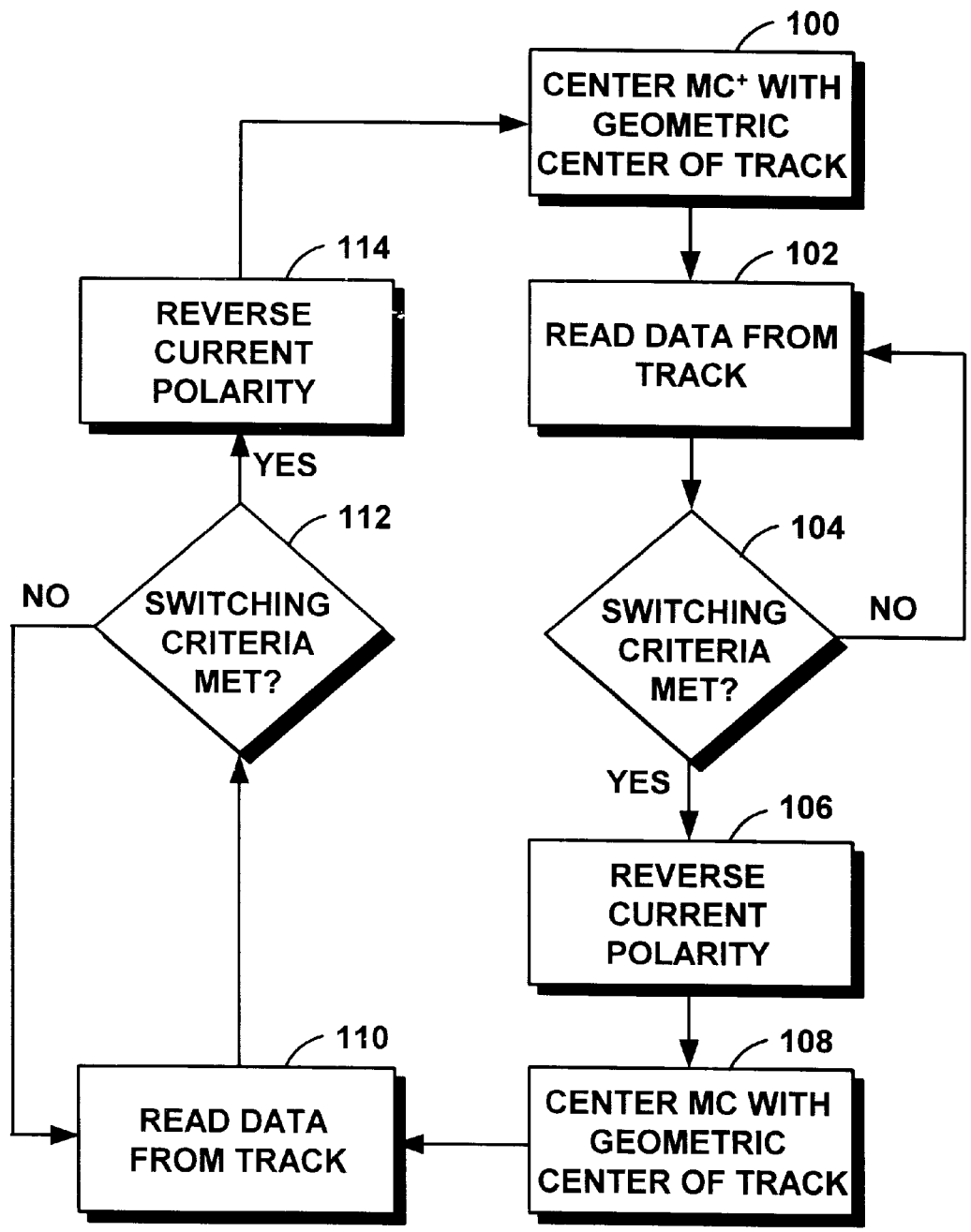
FIG. 2 is a functional flow chart of the operation of the MR head of FIG. 1.

With reference to FIG. 2 and starting at step 100, the control circuit 20 centers a first magnetic center, such as MC⁺ of the MR element 14 with the peak P⁺ of the positive micro-track voltage output profile PMT, such that MC⁺ coincides with the geometric center of the magnetic track from which data is being read (step 102).

The control circuit 20 then inquires at step 104 whether preset switching criteria have been satisfied. An exemplary criterion would be whether a predetermined time has elapsed between two consecutive reversals of the current polarities. It should be understood that other criteria for minimizing directional diffusion may alternatively be selected. The sense current magnitude and time in each direction may be equal, for example. An important factor in selecting the switching criteria is that electromigration in both directions should remain reversible.

If the preset criteria have not been met, the control circuit 20 continues to read data from the magnetic disk (step 102) and to inquire whether the desired criteria have been met (step 104). If on the other hand the preset criteria have been met, the control circuit 20 reverses the polarity of the current flowing through the MR element 14 (step 106), and simultaneously centers the magnetic center MC with the peak P of the negative micro-track voltage output profile NMT, such that point MC⁻ coincides with the geometric center of the magnetic disk track (step 108) from which data is being read (step 110).

The control circuit 20 then checks at step 112 whether the preset switching criteria have been satisfied. It should be noted that the preset criteria checked at steps 104 and 112 are preferably identical, but other criteria may alternatively be selected. If the criteria at step 112 have not been met, the control circuit 20 continues to read data from the magnetic disk (step 110) and to inquire whether the desired criteria have been met (step 112). If the criteria have been met, the control circuit 20 reverses the polarity of the current flowing through the MR element 14 (step 114), and simultaneously centers MC⁺ with the geometric center of the magnetic disk track (step 100). The foregoing process continues for as long as the disk drive remains operational.

In one embodiment of this invention the switching period, i.e., the time between two consecutive reversals of the current polarities (steps 106 through 114) ranges between 2 to 4 hours for a MR head intended to have a mean life of about 5 years. It should be clear that other periods may alternatively be selected.

Since electromigration within the MR element 14 has been minimized or suspended, the next objective is to determine the maximum current that could flow through the MR element 14 without inducing damaging diffusion effects. It is expected that by utilizing equal currents in two opposite directions for approximate equal time periods, the current density through the MR element 14 may be effectively doubled, resulting in approximate doubling of the output signal for the same MR element 14, i.e., a gain of at least 6 dB in the MR head, and hence improved signal-to-noise ratio.

For example, conventional MR heads are generally operated between 20° C. and 30° C. above ambient temperature. However, a MR head incorporating the present invention may be operated at 150° C. or more above ambient temperature, thus significantly improving the signal output of the MR element 14.

The analysis for obtaining optimal operating current will now be presented. Presuming that the diffusion of Ta (tantalum) into a 300 Angstrom-thick MR element made of NiFe, the activation energy (A) is estimated to be 71 Kcal (kilocalories). The following equation (3) may then be solved for the temperature (T):

$$D = D_0 \cdot e^{-A/RT} = x^2/2t, \qquad (3)$$

where D is the diffusion constant; $D_0$ is a constant approximately equal to unity; R is a constant and is equal to 1.98; T is the operating temperature in degrees Kelvin; x is the diffusion distance; and t refers to the time to reach a disabling diffusion condition, namely the life of the MR head. In one embodiment t is estimated to be 5 years. Using the above estimates, the operating temperature T of the MR element 14 is found to be approximately 150° C. above ambient temperature.

Considering that the power ($I^2R$) is proportional to the operating temperature T, the current (I) flowing through the MR element 14 would be at least twice that in conventional MR heads. This substantial increase in current automatically translates into a corresponding increase in output signal.

Figure 4:
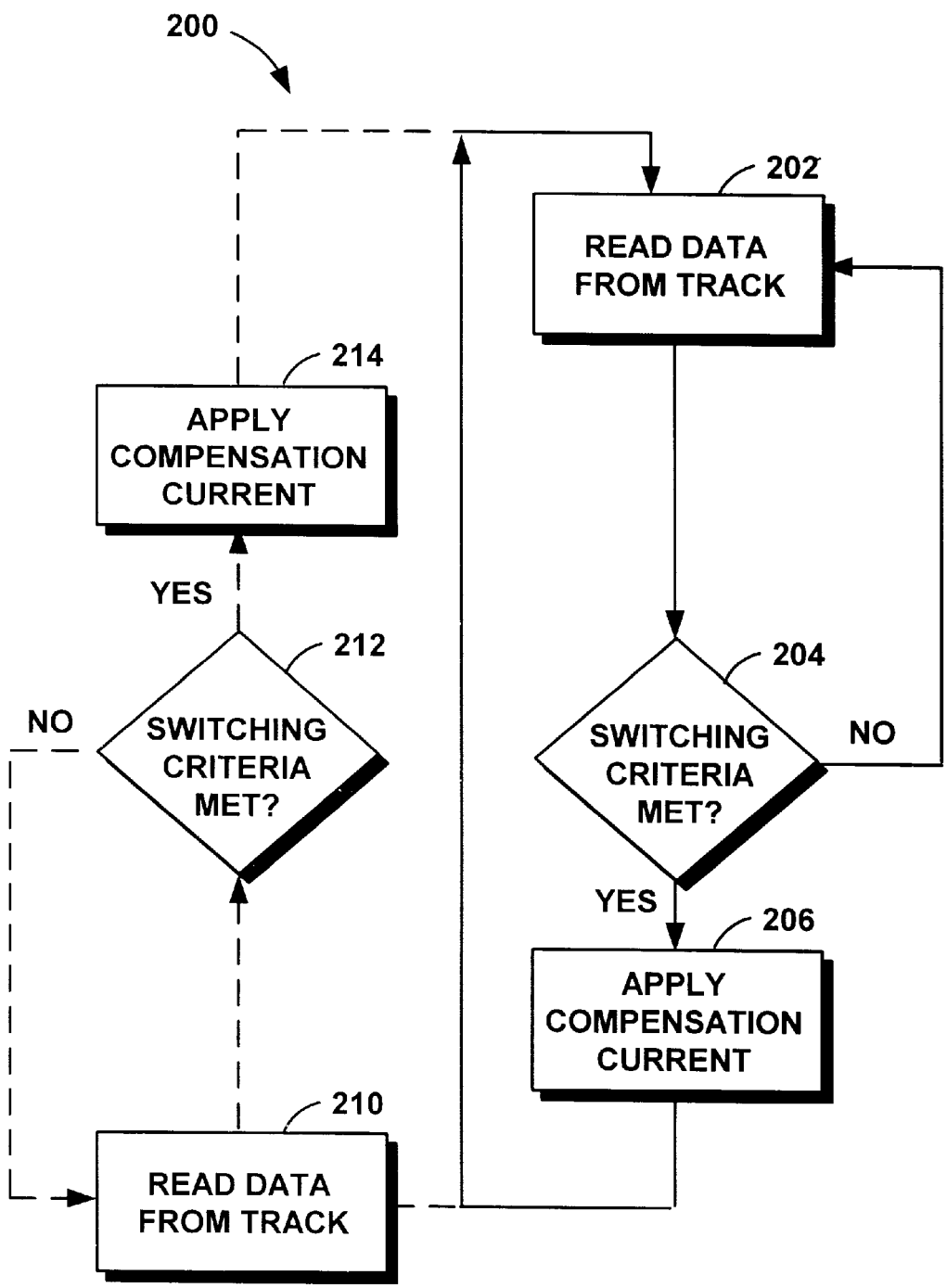
FIG. 4 is a functional flow chart of another MR head operation according to the present invention.

With reference to FIG. 4 the new operation process of the MR element 14 is referenced by the numeral 200. According to the operation process 200 the control circuit 20 is not required to center both magnetic centers MC⁺ and MC⁻ of the MR element 14 with respect to the peaks P⁺ and P⁻ of the positive and negative micro-track voltage output profiles. Rather, the control circuit 20 applies a sense current in a single direction, causes the MR head to read data from the magnetic disk (step 202), and then inquires at step 204 whether preset switching criteria have been satisfied.

An exemplary switching criterion is whether a predetermined time has elapsed before applying a compensation current at step 206. It should be understood that other switching criteria for minimizing directional diffusion may alternatively be selected. An important factor in selecting the switching criteria is that electromigration remains at least partially, if not totally reversible.

If the preset criteria have not been met, the control circuit 20 it repeats the routine of acquiring data from the magnetic disk (step 202) and inquiring whether the desired switching criteria have been met (step 204). When the preset switching criteria are met, the control circuit 20 causes a compensation current to flow through the MR element 14 (step 206). This compensation current is preferably applied during a quiescence period, that is when the MR element 14 is not reading data from the magnetic disk. For instance, the compensation current may be applied while the magnetic head is writing data onto the magnetic disk.

In a preferred embodiment, after the control circuit 20 completes the application of the compensation current at step 206, it repeats the routine of reading data from the magnetic disk (step 202), inquiring whether switching criteria have been met (step 204), and applying a compensation current when the switching criteria have been met (step 206).

FIG. 4 further illustrates an alternative embodiment (shown in dashed lines), wherein after the control circuit 20 has applied the compensation current (step 206), it acquires data from the magnetic disk (step 210), and then inquires whether a second set of preset switching criteria have been satisfied (step 212). It should be noted that the first set of preset criteria checked at steps 204 and the second set of preset criteria checked at step 212 may be identical, but other criteria may alternatively be selected. If the control circuit 20 determines that the second set of switching criteria have not been met (step 212), the MR head continues to read data from the magnetic disk (step 210) and the control circuit 20 inquires once again whether the desired criteria have been met (step 212). If the criteria were met, the control circuit 20 causes a compensation current to flow through the MR element 14 (step 214), and then acquires data from the magnetic disk (step 202). The compensation current is applied during a quiescence period. The foregoing routines of reading the data on the magnetic disk and subsequently applying a compensation current are repeated.

Figure 5:
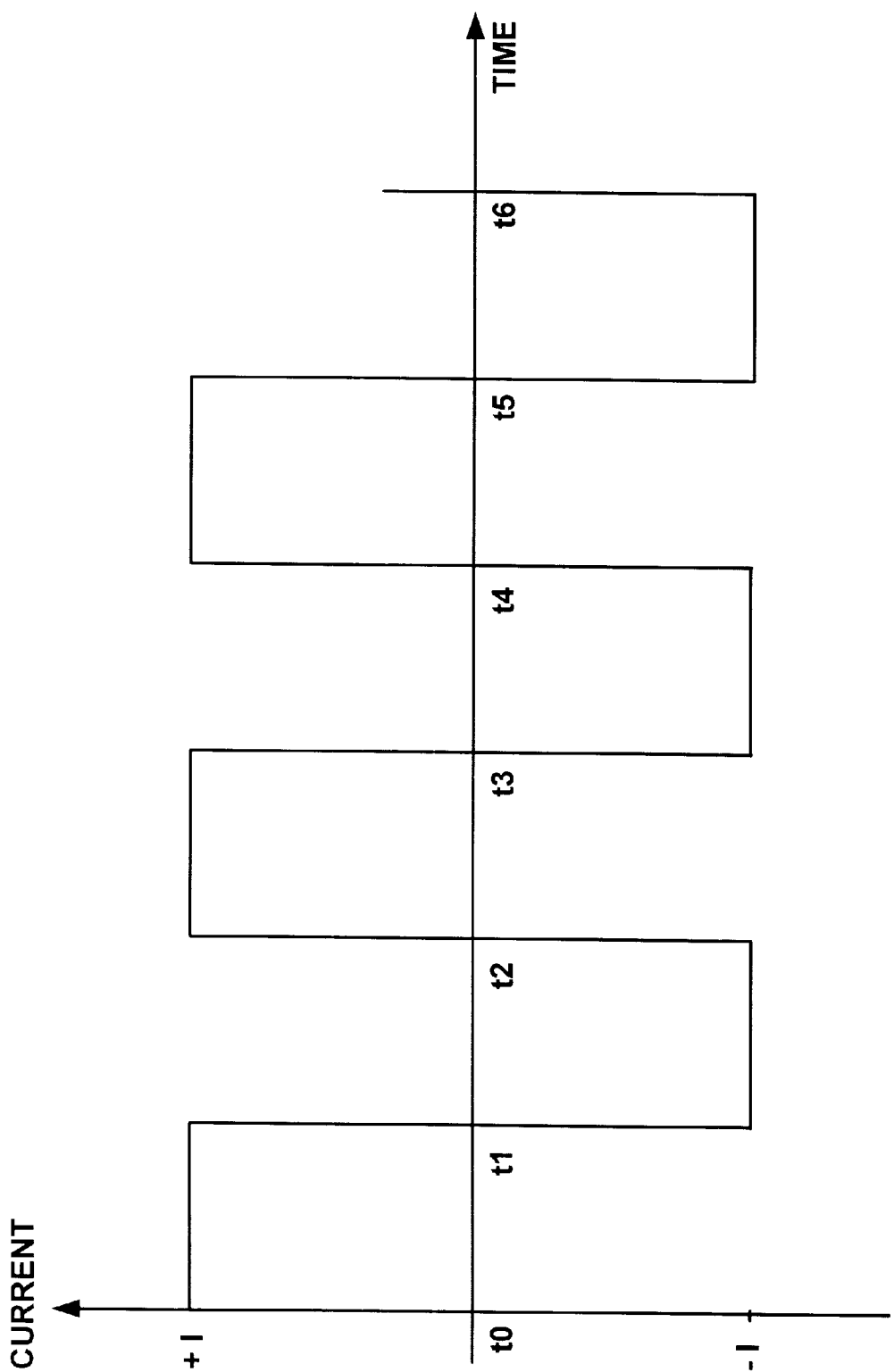
FIG. 5 is a plot of alternating sense and compensation currents through the MR head of FIG. 4.

FIG. 5 provides an exemplary graphical illustration of the operation process 200 of FIG. 4, by plotting the sense and compensation currents with respect to time. With further reference to FIG. 4, the period between time $t_0$ and time $t_1$ corresponds to step 202 during which a sense current +I is flown through the MR element 14 in a selected direction. At time $t_1$ the control circuit 20 performs step 204. When the control circuit 20 determines that the switching criteria have been met it applies a compensation current −I to the MR element 14 for a period between time $t_1$ and time $t_2$.

In this particular illustration the sense current +I and the compensation current −I have the same intensity but opposite directions. In addition, the sense current and the counter-directional compensation current are applied for the same duration of time such that period $(t_1-t_0)$ is equal to period $(t_2-t_1)$. The cycle or period, i.e., $(t_2-t_0)$ of applying the sense and compensation currents is repeated during the operation of the magnetic disk drive.

FIG. 5 illustrates another important aspect of the present invention, namely to specify the switching criteria for full or almost full reversibility in the direction of the sense current, in order to limit electromigration in the sense current direction. The switching criterion illustrated in FIG. 5 is the maximum time for applying the sense current before flowing the compensation current in the MR element 14. By way of example, in the simulation shown in FIG. 8, the sense period i.e., $(t_1-t_0)$ is set to 72 seconds. While the switching criteria for reversibility are described in relation to the operation process 200 of FIG. 4, it should be clear that these criteria may apply as well to the operation process illustrated in FIG. 2.

In summary, a preferred embodiment according to the present invention satisfies one or more of the following three switching conditions. The first condition is to flow a counter-directional compensation current through the MR element 14 so as to induce a total integrated power within the MR element 14 that counters the migratory effect of atoms within the structure caused by the electron wind. The second condition is to limit the acceptable diffusion length of the atoms within the structure to a distance of the order of less than one to a few atom diameters, such as 5 atom diameters, in order to obtain substantial full reversibility of electromigration. In one embodiment the atoms are allowed to diffuse for a distance less than one atom diameter, which eliminates the need to flow a compensation current through the MR element 14. In essence, as long as the atoms are not allowed to migrate beyond one atom diameter, it is believed that electromigration is significantly curbed if not entirely eliminated even if a continuous sense current is applied. The third condition is to flow the compensation current during a quiescence period.

Figure 6:
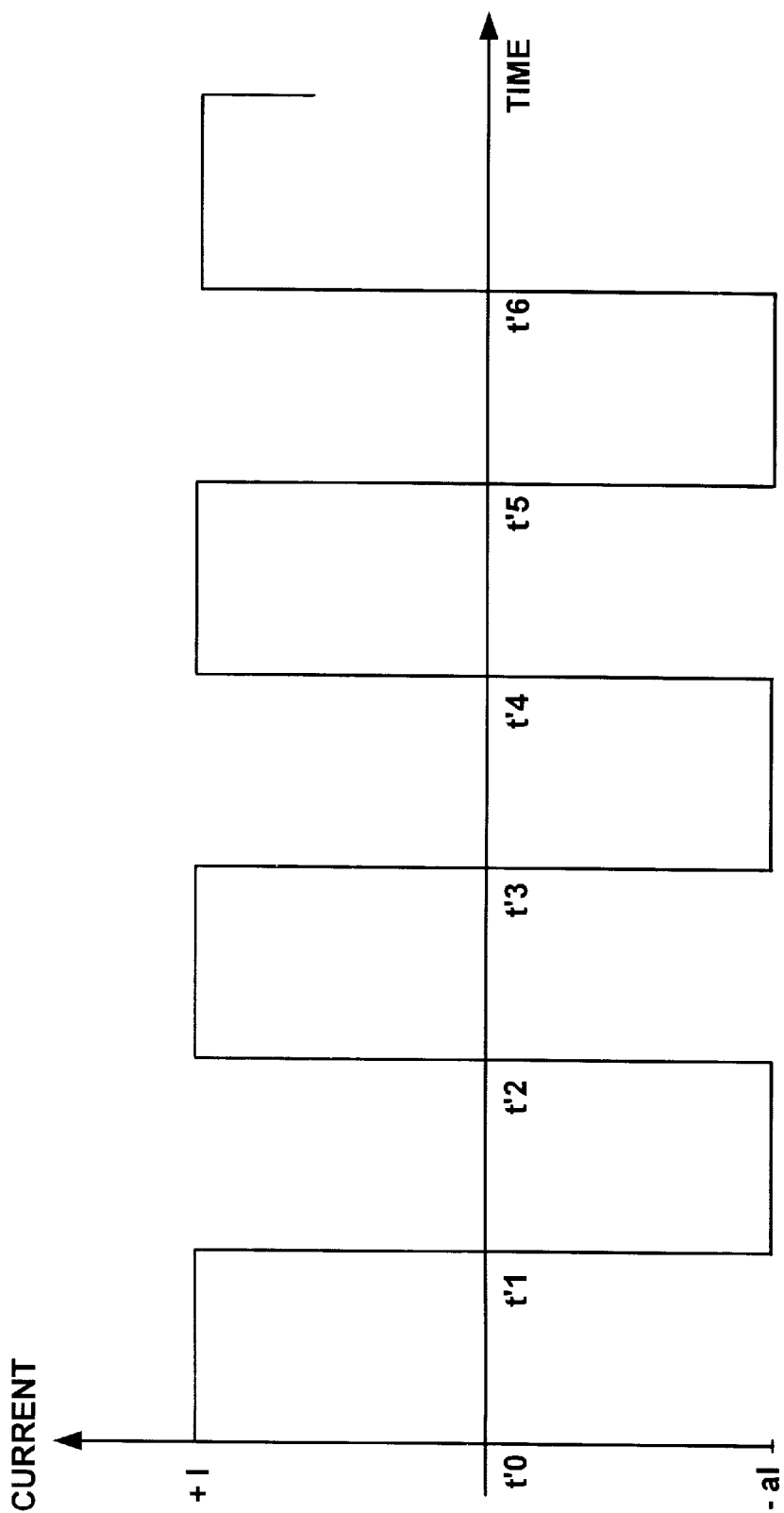
FIG. 6 is a plot illustrating another operation wherein sense and compensation currents of different intensities are flown through the MR head of FIG. 4.

In some applications it would be desirable to change the length of the quiescence period. FIG. 6 illustrates an application that requires the minimization of the quiescence period so as to optimize the data read/write response of the magnetic head. In such application a sense current +I is flown through the MR element 14 for a period $(t_1-t_0)$. A counter-directional compensation current −aI is flown for a period $(t_2-t_1)$, where a is a preset value greater than unity. Since it is desirable to set the power $(a^2I^2R)$ dissipated by the compensation current to be approximately greater than, or equal to the power $(I^2R)$ dissipated by the sense current, the period $(t_2-t_1)$ is shorter than the period $(t_1 - t_0)$.

Figure 7:
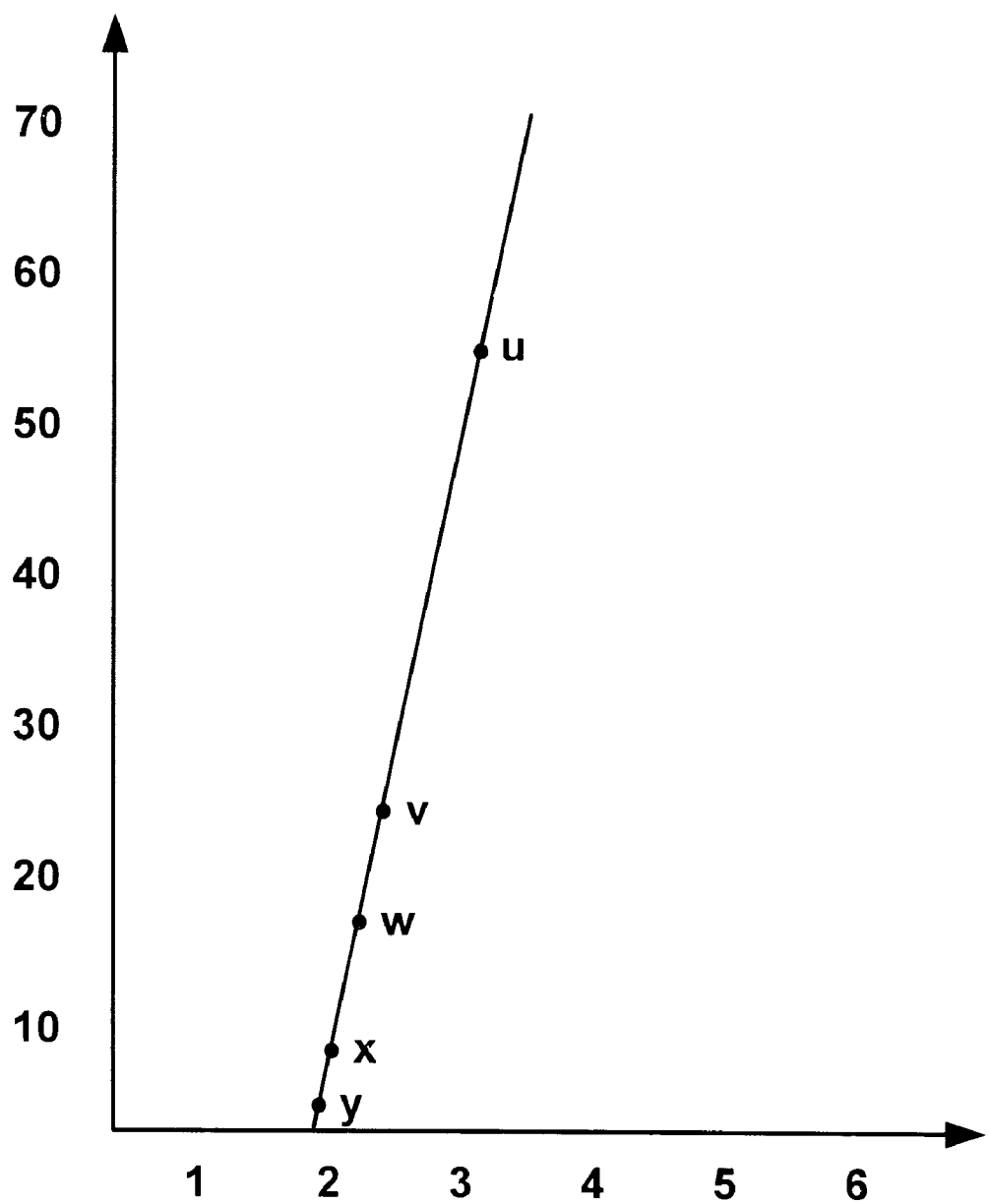
FIG. 7 is a graph plotting the logarithm of maximum time for substantial full reversibility versus 1/T, where T is the temperature of the MR head.

With reference to FIG. 7, the logarithm of the critical time for reaching the limit of substantial full reversibility is plotted versus 1/T, where T is the temperature of the MR element 14 measured in degrees Kelvin. Every MR structure has an activation energy that dictates the critical time. If this maximum or critical time were exceeded at a particular temperature then electromigration becomes only partially reversible or completely irreversible. The longer the critical time is exceeded, the less reversible electromigration becomes. The plot is based on empirical values (points u, v, w, x, y), and demonstrates that the following linear relationship exits between the logarithm of time and 1/T:

$$\text{Log Time Max} = 4409(1/T) - 7.72. \tag{4}$$

This equation may be generalized as follows:

$$\text{Log Time Max} = A(1/T) - B, \tag{5}$$

where A and B are constant values.

Figure 8:
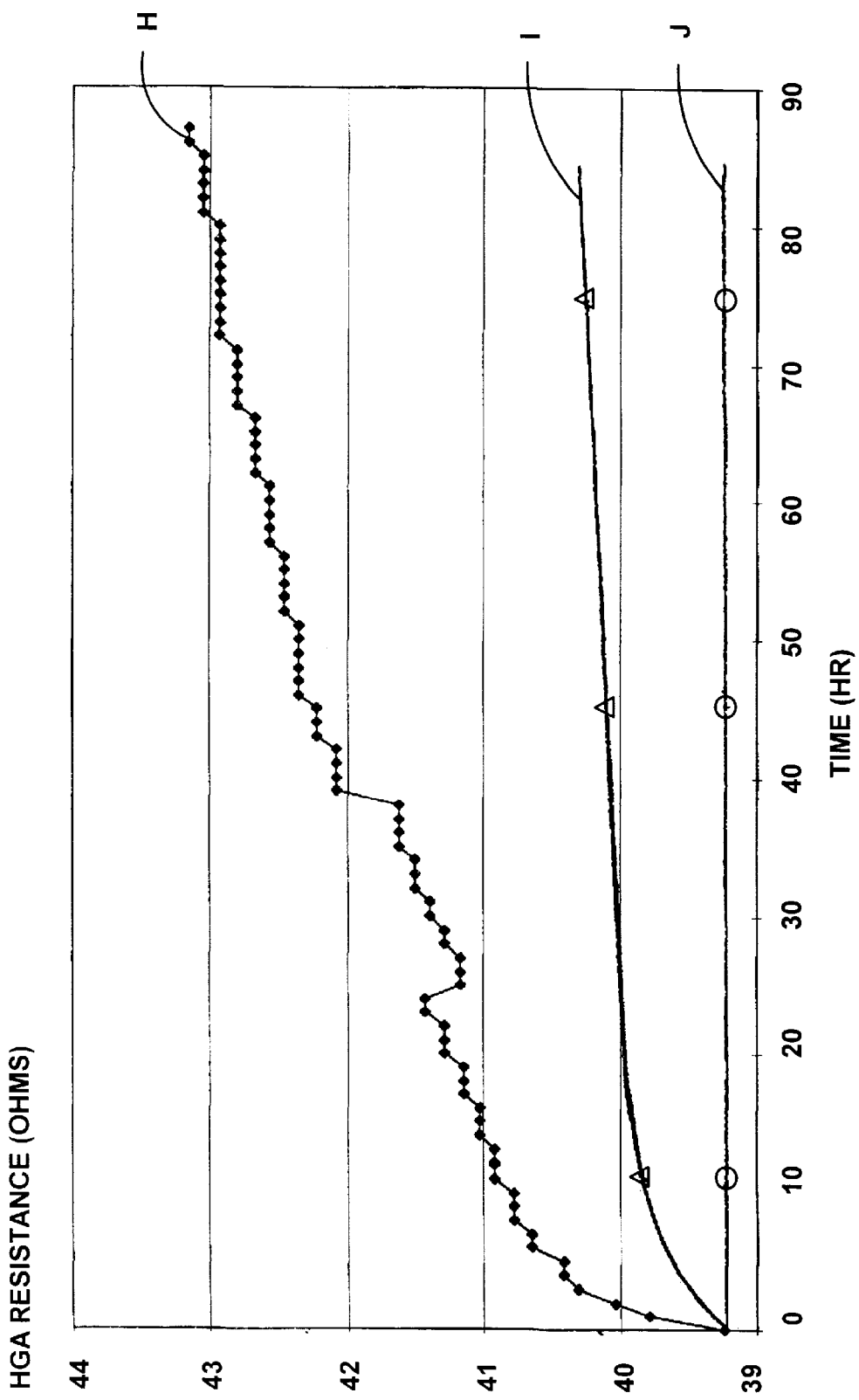
FIG. 8 is a life time simulation plot illustrating the resistance profiles of three MR heads relative to time.

FIG. 8 is a life time simulation plot illustrating the resistance profiles H, I, J in ohms of three different heads relative to time measured in hours. All three profiles H, I, J start at the same initial room temperature and resistance of approximately 39 ohms. The first profile H is generated by a conventional head operated using a unidirectional sense current of +21 mA without the application of a compensation current. The second profile I is generated by a head operated using a sense current of +21 mA for a period of 72 seconds and a counter directional compensation current of −21 mA for a similar period of 72 seconds, as generally described in relation to FIG. 5. The third profile J is generated by a head operated using a continuous sense current of approximately 21 mA which does not allow atomic excursion beyond one atom diameter. The third flat profile clearly illustrates the significant electromigration suppression attained using the teaching of the present invention.

Figure 9:
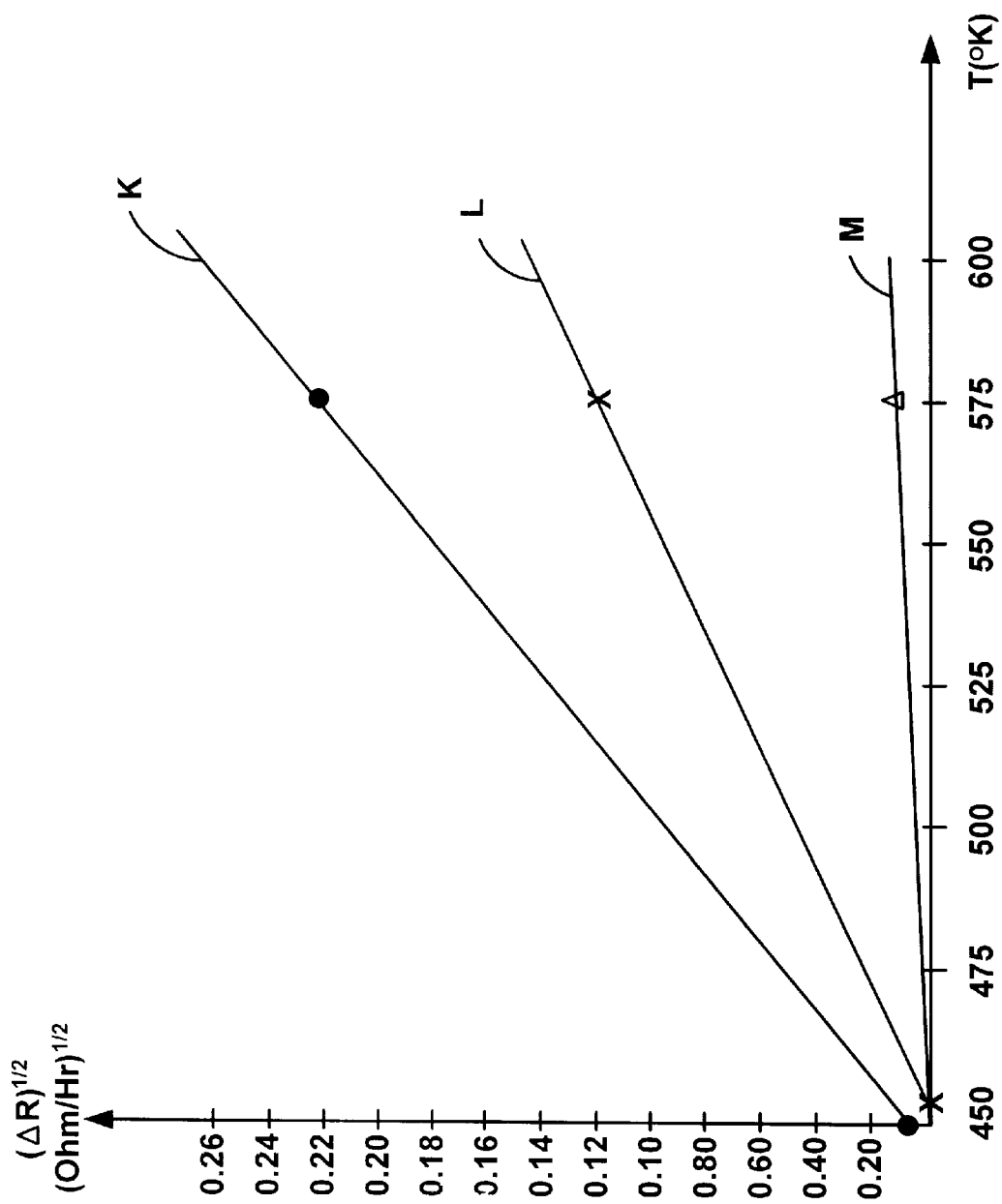
FIG. 9 is a plot illustrating the change in resistance profiles of the MR head relative to temperature, using no compensation current (Graph K), and two different compensation current periods (Graphs L and M)

FIG. 9 reflects a quantitative relationship between the rate of change of the resistance $(\Delta R)^{1/2}$ in the magnetoresistive element 14 measured in (ohms per hour)$^{1/2}$, relative to temperature (T) in degrees Kelvin. Graph K illustrates the rate of change of the resistance in a conventional MR head through which no compensation current is flown. The relationship between the rate of change of the resistance and temperature has been empirically obtained and is established by the following equation (6):

$$(\Delta R)^{1/2} 0.00162.T - 0.71477. \tag{6}$$

Graph L illustrates the rate of change of the resistance of the MR head 14 through which a counter-directional compensation current of 21 mA is flown for a switching period of 72 seconds. In this illustration, a sense current of 21 mA is also flown for the same period of time (i.e., 72 seconds). The relationship between the rate of change of the resistance and temperature has been empirically obtained and is established by the following equation (7):

$$(\Delta R)^{1/2} = 0.001192. T - 0.574. \tag{7}$$

Graph M illustrates the rate of change of the resistance of the MR head 14 through which a counter-directional compensation current of 21 mA is flown for a switching period of 1.2 seconds. In this illustration, a sense current of 21 mA is also flown for the same period of time (i.e., 1.2 seconds). The relationship between the rate of change of the resistance and temperature has been empirically obtained and is established by the following equation (8):

$$(\Delta R)^{1/2} = 0.0003668. T - 0.16866. \tag{8}$$

FIG. 9 demonstrates that the gain in life, i.e., the reduction of the rate of change of the resistance of the MR element 14 is improved when the switching period of the sense current and the compensation current is shortened. This conclusion holds true at all operating temperatures.

Figure 10:
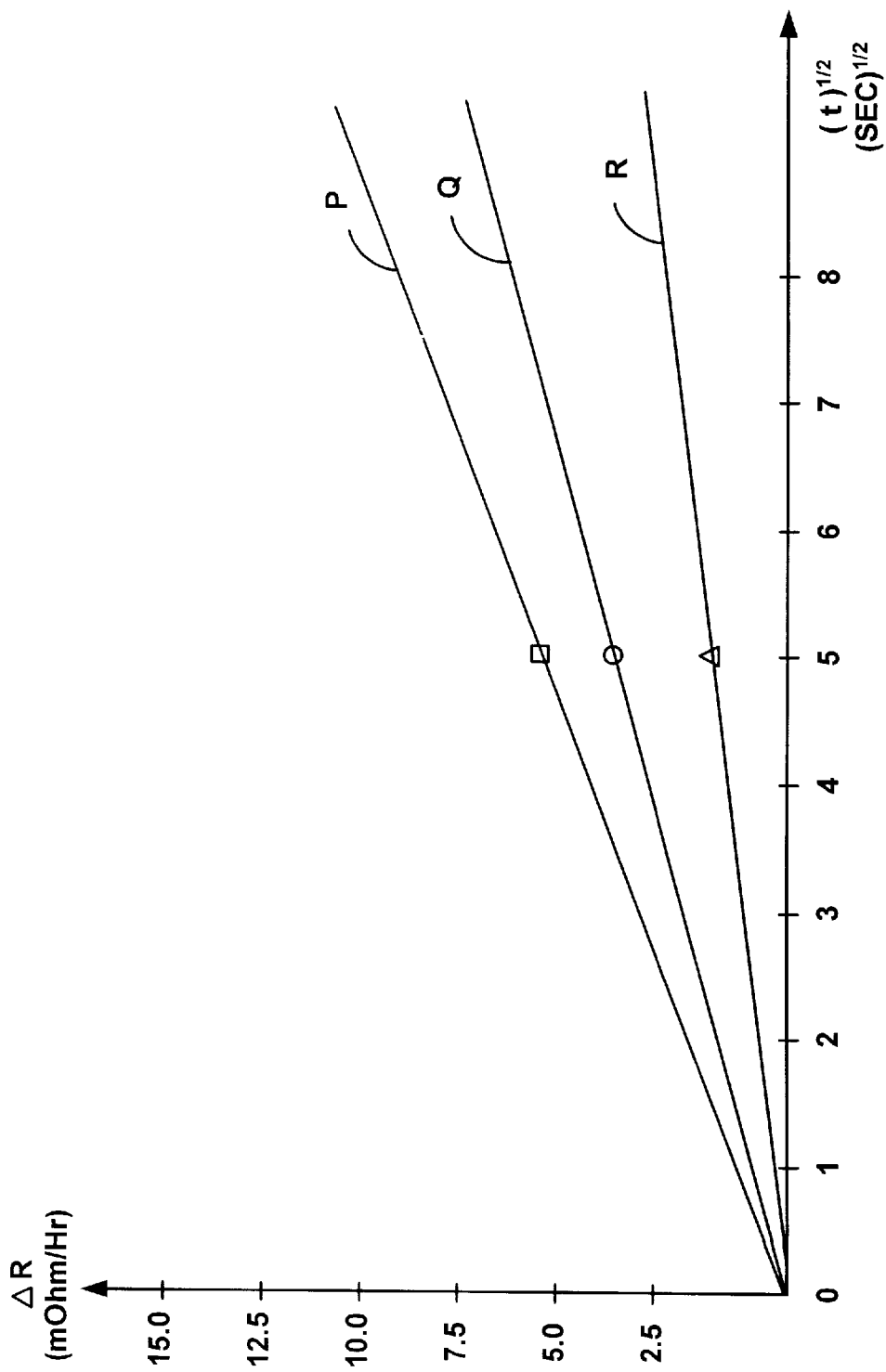
FIG. 10 is a plot derived from FIG. 9, illustrating the change in resistance of the MR head relative to time, at various temperatures.

FIG. 10 reflects a quantitative relationship between the change in resistance ($\Delta R$) of the MR element 14 relative to time, measured in ohms per hour, relative to the square root of time $(t)^{1/2}$ in (seconds)$^{1/2}$. Graph P illustrates the rate of change of the resistance in the three MR heads described in relation to FIG. 9, at a temperature of 575 degrees Kelvin. The relationship between the rate of change of the resistance and time is established by the following equation (9):

$$(\Delta R) = 0.00216. (t)^{1/2}. \tag{9}$$

Graph Q illustrates the rate of change of the resistance in the three MR heads described in relation to FIG. 9, at a temperature of 550 degrees Kelvin. The relationship between the rate of change of the resistance and time is established by the following equation (10):

$$(\Delta R) = 0.00135. (t)^{1/2}. \tag{10}$$

Graph R illustrates the rate of change of the resistance in the three MR heads described in relation to FIG. 9, at a temperature of 525 degrees Kelvin. The relationship between the rate of change of the resistance and time is established by the following equation (11):

$$(\Delta R) = 0.00072. (t)^{1/2}. \tag{11}$$

FIG. 10 demonstrates that the rate of change of the resistance at any transducer or MR element 14 temperature scales with the square root of time. The following Table I is generated based on the foregoing equation (11).

TABLE I

| Switching Period "t" (sec.) | $\Delta R$ (mOhm/Hr) | DC Rate (Sec) |
| --- | --- | --- |
| 733 (DC) | 19.5 | |
| 72 | 6.1 | 3.19 |
| 1.2 | 0.79 | 24.7 |
| 0.5 | 0.51 | 38.2 |
| 0.2 | 0.32 | 60.9 |
| 0.1 | 0.23 | 84.8 |
| 0.05 | 0.16 | 122 |
| 0.02 | 0.10 | 195 |
| 0.01 | 0.072 | 271 |
| 0.005 | 0.051 | 38.2 |

Figure 11:
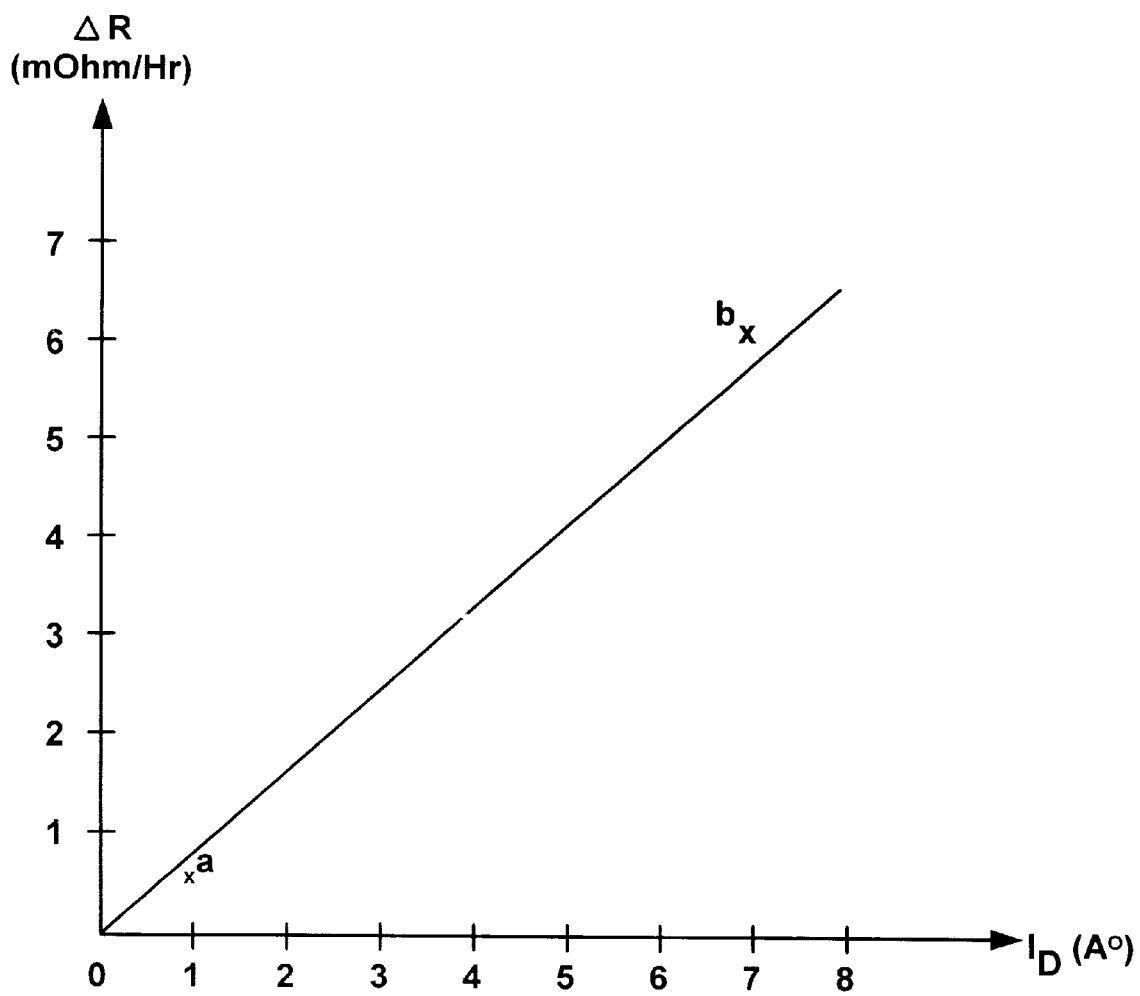
FIG. 11 is a graph plotting the change in resistance in resistance of the MR head relative to the diffusion length at a temperature of 5250 K.

With reference to FIG. 11, the empirical data demonstrate that the diffusion length ($I_D$) or excursion of electromigration within the MR element 14 establishes a substantially linear relationship with the rate of variation of the resistance ($\Delta R$). As an example, by applying equation (3) above for an activation energy of 17.6 Kcal, and a constant $D_0$ equal to $6.8 \times 10^{-10}$, the diffusion constant D is $30 \times 10^{-18}$ cm$^2$/second.

In addition, the directional diffusion length ($I_D$) is related to the diffusion constant D and to time t, by the following equation (12):

$$(I_D) = [2.D.t_{1/2}]^{1/2} \tag{12}$$

where $t_{1/2}$ is equal to half the switching period. By applying equation (12), the diffusion lengths ($I_D$) for a conventional MR head without a compensation current, for a MR head using a switching period of 72 seconds, and for a MR head using a switching period of 1.2 second, are 21 Angstroms, 6.6 Angstroms (point b), and 0.85 Angstroms (point a); respectively.

It should be understood that the geometry, dimensions and parameters described above may be modified within the scope of the invention. For example, the inventive concept presented herein is equally applicable to spin valves, GMR's and other similar structures.

What is claimed is:

1. A magnetoresistive head for reading data from a magnetic medium comprising:

a magnetoresistive element through which a unidirectional sense current is flown; and a control circuit for determining whether one or more switching criteria have been met and for applying a counter-directional compensation current in said magnetoresistive element when said one or more switching criteria are met, such that electromigration in said magnetoresistive element is substantially reduced in the direction of said sense current, and wherein a sense period during which said sense current is flown through said magnetoresistive element is approximately 73 seconds.

2. A magnetoresistive head according to claim 1, wherein said compensation current is applied during a quiescence period.

3. A magnetoresistive head according to claim 2, wherein said quiescence period changes in length during the operation of the magnetoresistive head.

4. A magnetoresistive head according to claim 2, wherein said compensation current is applied while the magnetic head is writing data onto the magnetic medium.

5. A magnetoresistive head according to claim 2, wherein said one or more switching criteria include setting a maximum sense time.

6. A magnetoresistive head according to claim 1, wherein said control circuit applies said sense current and said compensation current periodically.

7. A magnetoresistive head according to claim 1, wherein said sense current and said compensation current have substantially equal intensities.

8. A magnetoresistive head according to claim 7, wherein said sense current and said compensation current are applied periodically for substantially equal periods of time.

9. A magnetoresistive head according to claim 1, wherein the intensities of said sense current and said compensation current are not equal.

10. A magnetoresistive head according to claim 9, wherein said sense current and said compensation current are applied periodically for different periods of time such that substantially equal total integrated powers are induced within said magnetoresistive element during said different periods, for countering the migratory effect of atoms.

11. A magnetoresistive head according to claim 1, wherein said sense current is applied for a period of time, so as to prevent atomic excursion beyond a predetermined number of atom diameters.

12. A magnetoresistive head according to claim 1, wherein said sense current is applied for a period of time to prevent atomic excursion beyond approximately one atom diameter.

13. A method for reading data from a magnetic medium using a magnetoresistive head comprising:

flowing a unidirectional sense current through a magnetoresistive element;

determining whether one or more switching criteria have been met; and applying a counter-directional compensation current in said magnetoresistive element when said one or more switching criteria are met, such that electromigration in said magnetoresistive element is substantially reduced in the direction of said sense current;

wherein said sense current and said compensation current are periodically alternated during the operation of the magnetic head;

wherein determining whether one or more switching criteria have been met includes setting a maximum time limit for said sense current that is not exceeded prior to applying a compensation current; and further including establishing a switching criterion wherein a substantially linear relationship is set between the logarithm of said maximum time limit and the inverse of temperature, as follows:

Log Time Max=$A(1/T)-B$, where A and B are constant values.

14. A method according to claim 13, wherein said values A and B are set as follows:

A=4409;

B=7.72.

15. A magnetoresistive head for reading data from a magnetic medium comprising:

a magnetoresistive element through which a continuous unidirectional sense current is flown;

a control circuit for determining whether one or more switching criteria have been met, and for suspending said sense current in said magnetoresistive element for a period of time, so as to prevent atomic excursion beyond a predefined number of atom diameters;

wherein electromigration in said magnetoresistive element is substantially reduced in the direction of said sense current; and wherein said atomic excursion is less than approximately one atom diameter.

16. A magnetoresistive head according to claim 15, wherein said sense current is preferably suspended during a quiescence period.

17. A magnetoresistive head according to claim 16, wherein said sense current is suspended while the magnetic head is writing data onto the magnetic medium.

18. A magnetoresistive head for reading data from a magnetic medium using a magnetoresistive head comprising:

flowing a continuous unidirectional sense current through a magnetoresistive element;

determining whether one or more switching criteria have been met;

suspending said sense current in said magnetoresistive element for a period of time, so as to prevent atomic excursion beyond a predefined number of atom diameters, wherein electromigration in said magnetoresistive element is substantially reduced in the direction of said sense current; and wherein suspending includes suspending said sense current for a sufficient time to prevent atomic excursion beyond approximately one atom diameter.

19. A method according to claim 18, wherein said step of suspending includes suspending said sense current during a quiescence period.

20. A method according to claim 18, wherein said step of suspending includes suspending said sense current while the magnetic head is writing data onto the magnetic medium.

21. A magnetoresistive head for reading data from a magnetic medium, comprising:

a magnetoresistive element through which a unidirectional sense current is flown; and a control circuit for determining whether one or more switching criteria have been met and for applying a counter-directional compensation current in said magnetoresistive element when said one or more switching criteria are met, such that electromigration in said magnetoresistive element is substantially reduced in the direction of said sense current;

wherein said sense current and said compensation current are periodically alternated during the operation of the magnetic head;

wherein said control circuit determines a maximum time limit for said sense current that is not exceeded prior to applying a compensation current; and wherein said control circuit establishes a switching criterion whereby a substantially linear relationship is set between the logarithm of said maximum time limit and the inverse of temperature, as follows:

Log Time Max=$A(1/T)-B$, where A and B are constant values.

* * * * *